United States Patent [19]
Lees et al.

[11] Patent Number: 5,495,775
[45] Date of Patent: Mar. 5, 1996

[54] STEPPED MOTOR VEHICLE TRANSMISSION

[75] Inventors: Wolfgang Lees, Ludwigsburg; Gerold Mörk, Waiblingen, both of Germany

[73] Assignee: Getrag Getriebe-Und Zahnradfabrik Hermann . . ., Ludwigsburg

[21] Appl. No.: 321,687

[22] Filed: Oct. 12, 1994

[51] Int. Cl.$^6$ .................................................. F16H 3/087
[52] U.S. Cl. ................................................................ 74/331
[58] Field of Search ................................................. 74/331

[56] References Cited

U.S. PATENT DOCUMENTS 5,031,473  7/1991  Yumoto et al. ............................ 74/331

FOREIGN PATENT DOCUMENTS

3320494C2  12/1984  Germany .
4116189A1  11/1991  Germany .
4136455A1  5/1993  Germany .

Primary Examiner—Dirk Wright
Attorney, Agent, or Firm—Claude A. S. Hamrick

[57] ABSTRACT

A stepped motor vehicle transmission comprises an input shaft, a first and a second intermediate shaft and an output shaft. The shafts are arranged parallel to each other, but only two each are arranged in a common plane. Toothed wheels are provided on the shafts meshing in pairs with each other. Gearshift sleeves are provided for drivingly connect one each loose toothed wheel of the pairs with the respective shaft on which they are journaled. The respective other toothed wheels of the pairs are designed as fixed wheels. The input shaft, the first intermediate shaft and the second intermediate shaft are each provided with a gearshift sleeve being displaceable in two gearshift directions each for engaging a total of five forward gears and one reverse gear. One supplemental fixed toothed wheel on the first intermediate shaft meshes with a loose toothed wheel on the input shaft. Further, one supplemental fixed toothed wheel on the second intermediate shaft meshes with a toothed wheel on the output shaft.

1 Claim, 4 Drawing Sheets

STEPPED MOTOR VEHICLE TRANSMISSION

FIELD OF THE INVENTION

The present invention relates to motor vehicle transmissions. More particularly, the invention relates to multi-stepped motor vehicle transmissions or stickshift transmissions in which the various forward gears and the reverse gears are manually selected and engaged.

BACKGROUND OF THE INVENTION

Multi-stepped motor vehicle transmissions or gearboxes having an input shaft, a first and a second intermediate shaft and an output shaft are well known in the art, see e.g. German patent specification 33 20 494, German published patent application 41 36 455 and German published patent application 41 16 189.

In the prior art transmission as disclosed in German patent specification 33 20 494 the arrangement of the input shaft and of the second intermediate shaft is conventional because two toothed wheels each (for the lower four forward gears) are designed as fixed wheels, whereas two further toothed wheels are designed as loose toothed wheels and are arranged on the two mentioned shafts to operate as gearshift wheels. The term "fixed wheel" shall hereinafter mean a toothed wheel being rigidly arranged on a shaft whereas the term "loose wheel" shall mean a toothed wheel being loosely journaled on a shaft but may be rigidly connected to that shaft by means of a gearshift sleeve as is well known to a person of ordinary skill. In the prior art transmission the reverse gear function is associated to the first intermediate shaft. For that purpose the first intermediate shaft carries two loose toothed wheels which, by means of a supplemental gearshift sleeve may be drivingly connected with each other but still being loosely journaled on the first intermediate shaft. These two loose toothed wheels on the first intermediate shaft each mesh with a loose toothed wheel on the input shaft and on the second intermediate shaft, respectively, namely with the loose toothed wheel associated to the third forward gear on the input shaft and with the loose toothed wheel associated to the first forward gear on the second intermediate shaft, respectively. Additionally, this prior art transmission is provided with a pair of toothed wheels constituting a fifth forward gear and being arranged on the input shaft and on the second intermediate shaft, respectively.

This prior art has a reduced axial length, as compared with still older transmission designs having all five forward gears and the reverse gear of a five gear transmission on two transmission shafts in parallel toothed wheel planes each.

The prior art transmission necessitates a total of four gearshift sleeves. A first gearshift sleeve being displaceable in two gearshift directions for the third and the fourth forward gear is provided on the input shaft. A second gearshift sleeve being also displaceable in two gearshift directions for the first and the second forward gear is provided on the second intermediate shaft. One further gearshift sleeve being displaceable only in one gearshift direction for the fifth forward gear is also arranged on the second intermediate shaft. A fourth gearshift sleeve being also displaceable only in one gearshift direction for the reverse gear is arranged on the first intermediate shaft, as already mentioned above.

Another prior art multi-stepped motor vehicle transmission having at least two intermediate shafts is disclosed in German disclosure document 41 36 455. This prior art transmission is a six-gear transmission. For engaging one of the six forward gears three distinct gearshift sleeves are provided being each displaceable in two gearshift directions, whereas one more gearshift sleeve, being displaceable only in one gearshift direction, is provided for engaging the reverse gear.

It is, therefore, an object underlying the invention to improve a multi-stepped motor vehicle transmission as mentioned at the outset such that the number of gearshift sleeves is reduced to a minimum and the design complexity as well as the dimensions are also reduced to a minimum, yet having a maximum of forward gears and a reverse gear, all being synchronized and being adapted to be engaged individually.

SUMMARY OF THE INVENTION

This object is achieved by a stepped motor vehicle transmission, comprising:

an input shaft;

a first intermediate shaft extending parallel to said input shaft;

a second intermediate shaft extending parallel to said input shaft;

an output shaft extending parallel to said input shaft;

a first fixed toothed wheel on said input shaft and a first loose toothed wheel on said first intermediate shaft meshing with each other and constituting a first forward gear;

a second fixed toothed wheel on said input shaft and a second loose toothed wheel on said first intermediate shaft meshing with each other and constituting a second forward gear;

first gearshift sleeve means arranged on said first intermediate shaft to drivingly connect either said first or said second loose toothed wheel with said first intermediate shaft;

a third loose toothed wheel on said input shaft and a third fixed toothed wheel on said second intermediate shaft meshing with each other and constituting a third forward gear;

a fourth loose toothed wheel on said input shaft and a fourth fixed toothed wheel on said second intermediate shaft meshing with each other and constituting a fourth forward gear;

second gearshift sleeve means arranged on said input shaft to drivingly connect either said third or said fourth loose toothed wheel with said input shaft;

a fifth loose toothed wheel on said second intermediate shaft and a fifth fixed toothed wheel on said input shaft meshing with each other and constituting a fifth forward gear;

a sixth loose toothed wheel on said second intermediate shaft meshing with said first loose toothed wheel and constituting a reverse gear;

third gearshift sleeve means arranged on said second intermediate shaft to drivingly connect either said fifth or said sixth loose toothed wheel with said second intermediate shaft;

a sixth fixed toothed wheel on said first intermediate shaft meshing with said third loose toothed wheel; and a seventh fixed toothed wheel on said second intermediate shaft and an eighth toothed wheel on said output shaft meshing with each other.

The object underlying the invention is thus entirely achieved. For, the invention distinguishes from the prior art concept to provide a separate gearshift sleeve, being displaceable only in one gearshift direction for selectively engage the reverse gear. In contrast, the invention integrates the reverse gear such that the reverse gear and one of the forward gears may be engaged by one and the same gearshift sleeve being displaceable in two distinct gearshift directions. This is accomplished by distributing the functions, and the gears on the input shaft and on the two intermediate shafts, as explained before.

According to a preferred embodiment of the invention, relating to a five-gear transmission having a synchronized reverse gear, one gearshift sleeve is provided for selectively engaging the third and the fourth forward gear, respectively, another gearshift sleeve is provided for selectively engaging the fifth gear and the reverse gear, respectively, and still another gearshift sleeve serves for selectively engaging the first gear and the second gear, respectively.

Insofar, it is preferred when a loose toothed wheel associated to the first forward gear meshes with the loose toothed wheel associated to the reverse gear.

When doing so a very compact deign may be obtained.

BRIEF DESCRIPTION OF THE DRAWINGS

The invention will become more apparent from the remaining portion of the description in connection with the claims and the attached drawings.

A preferred embodiment of the invention is shown in the drawing and will be explained in more detail in the subsequent description.

In FIG. 1 reference numeral 10 as a whole indicates a stepped motor vehicle transmission, namely a five-gear transmission having a synchronized reverse gear. However, it goes without saying that the invention may also be used for transmissions having another number of gears, for example four-gear transmissions or six-gear transmissions, each having a synchronized reverse gear.

Transmission 10 comprises an input shaft 11 being rotatably driven by a combustion drive engine (not shown).

Transmission 10 further comprises a first intermediate shaft 13 and a second intermediate shaft 14, being each arranged parallel to input shaft 11. Moreover, an output shaft 15 is provided being directly linked to the driving wheels of the vehicle.

Figure 1:
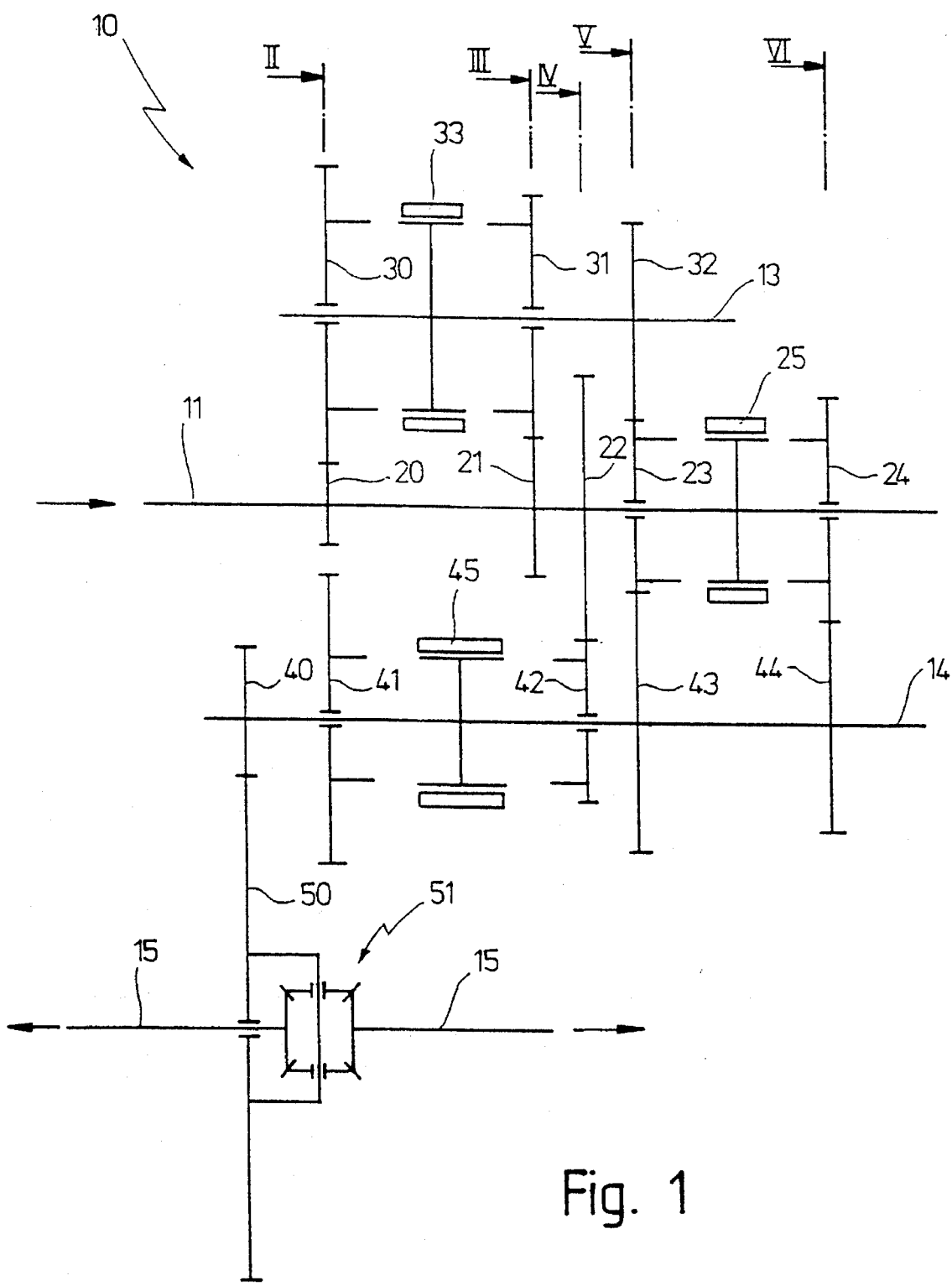
FIG. 1 shows a schematic gearshift diagram of a preferred embodiment of a stepped motor vehicle transmission according to the invention, being a five-gear transmission having a synchronized reverse gear.

The representation of FIG. 1 is a so-called unrolled representation where the four shafts 11, 13, 14 and 15 are all arranged in one plane. However, in reality, shafts 11, 13, 14 and 15 are arranged parallel to each other, yet only two each are located in a common plane. This is illustrated in FIGS. 2 through 6 for shafts 11, 13 and 14.

Input shaft 11 carries toothed wheels 20 through 24. Toothed wheels 20 through 22 are designed as so-called fixed toothed wheels and are rigidly, i.e. drivingly connected with input shaft 11. In contrast, toothed wheels 23 and 24 are designed as so-called loose toothed wheels or gearshift wheels and are arranged freely rotatable on input shaft 11.

By means of a gearshift sleeve 25 of conventional design and being displaceable in two distinct gearshift directions, one of the two loose toothed wheels 23 or 24 may selectively be engaged to be drivingly connected with input shaft 11.

First intermediate shaft 13 carries toothed wheels 30 through 32. Toothed wheels 30 and 31 are also designed as loose toothed wheels or gearshift wheels whereas toothed wheel 32 is designed as a fixed toothed wheel. A gearshift sleeve 33 serves to selectively and drivingly connect toothed wheels 30 or 31 with first intermediate shaft 13.

Second intermediate shaft 14 of transmission 10 carries toothed wheels 40 through 44. Toothed wheels 40, 43 and 44 are designed as fixed toothed wheels, whereas toothed wheels 41 and 42 are designed as loose toothed wheels or gearshift wheels and are arranged freely rotatable on second intermediate shaft 14. A gearshift sleeve 45, being also displaceable in two distinct gearshift directions serves for selectively and rigidly connecting one of the two loose toothed wheels 41 or 42 with second intermediate shaft 14.

Fixed toothed wheel 40 on second intermediate shaft 14 meshes with a toothed wheel 50 on output shaft 15 being part of a differential gear 51 of conventional design.

In the embodiment shown in FIG. 1 first gearshift sleeve 25 serves for engaging either the third forward gear (left hand position) or the fourth forward gear (right hand position). Second gearshift sleeve 33 serves for engaging the first forward gear (left hand position) and the second forward gear (right hand position), respectively. Third gearshift sleeve 45 serves for engaging the reverse gear (left hand position) and the fifth forward gear (right hand position).

As becomes apparent from the lateral views of FIGS. 2 through 6, the various pairs of toothed wheels on the three shafts 11, 13 and 14 are engaging each other in various planes.

Figure 2:
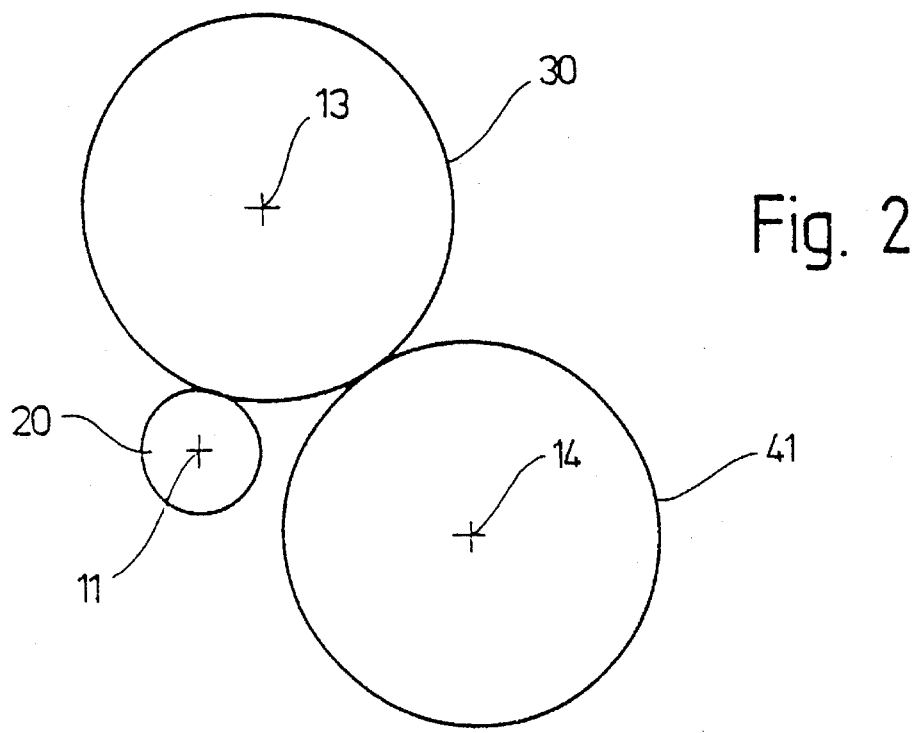
FIGS. 2 through 6 show schematic representations of the associated toothed wheels along the planes II through VI of FIG. 1.

Within plane II of FIG. 1, as shown in FIG. 2, fixed toothed wheel 20 on input shaft 11, for example, meshes with loose toothed wheel 30 (i.e. the gearshift wheel associated to the first forward gear) on first intermediate shaft 13. Loose toothed wheel 30, in turn, meshes with loose toothed wheel 41 (i.e. the gearshift wheel of the reverse gear) on second intermediate shaft 14.

Figure 3:
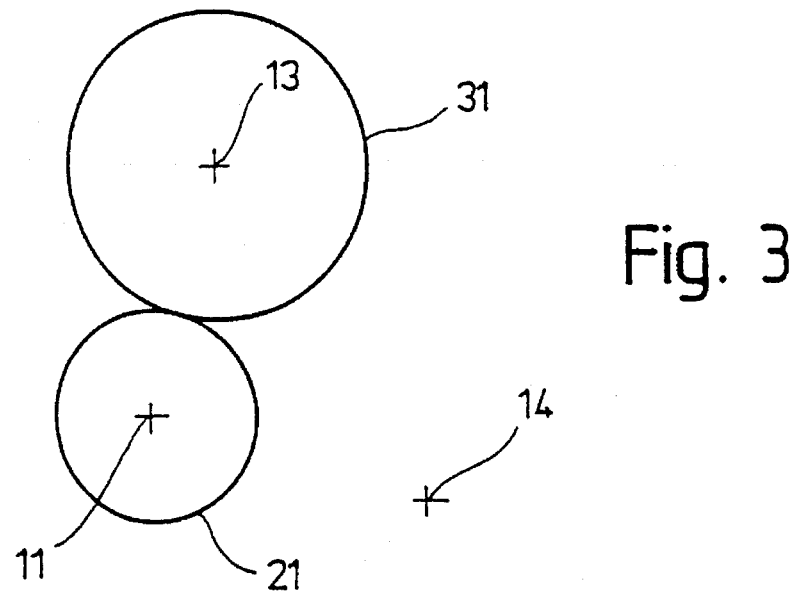
Figure 4:
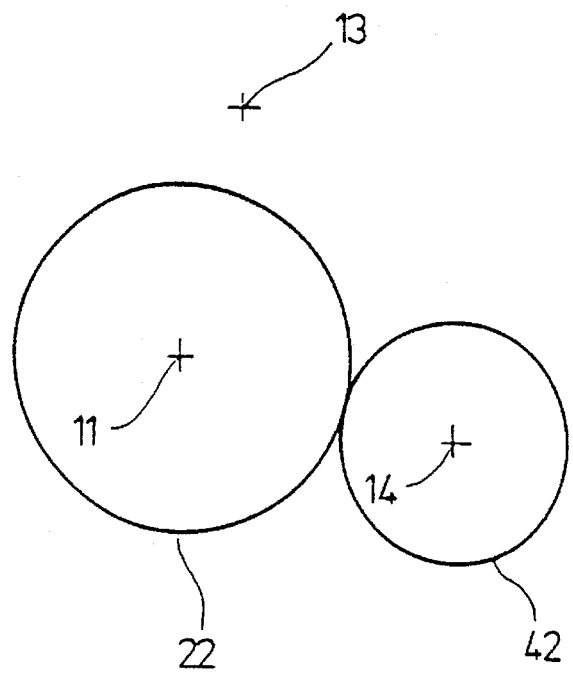
Figure 5:
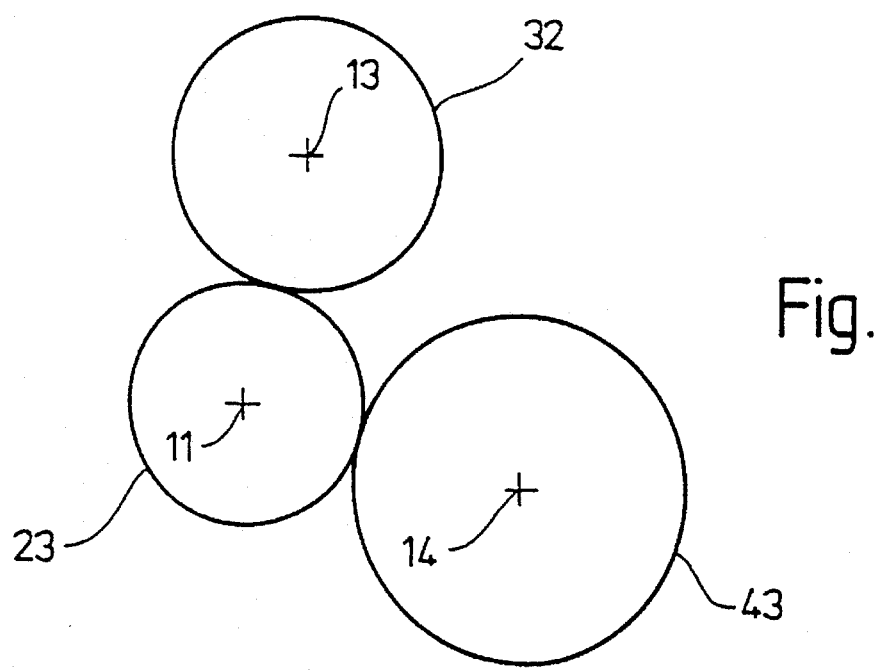
Figure 6:
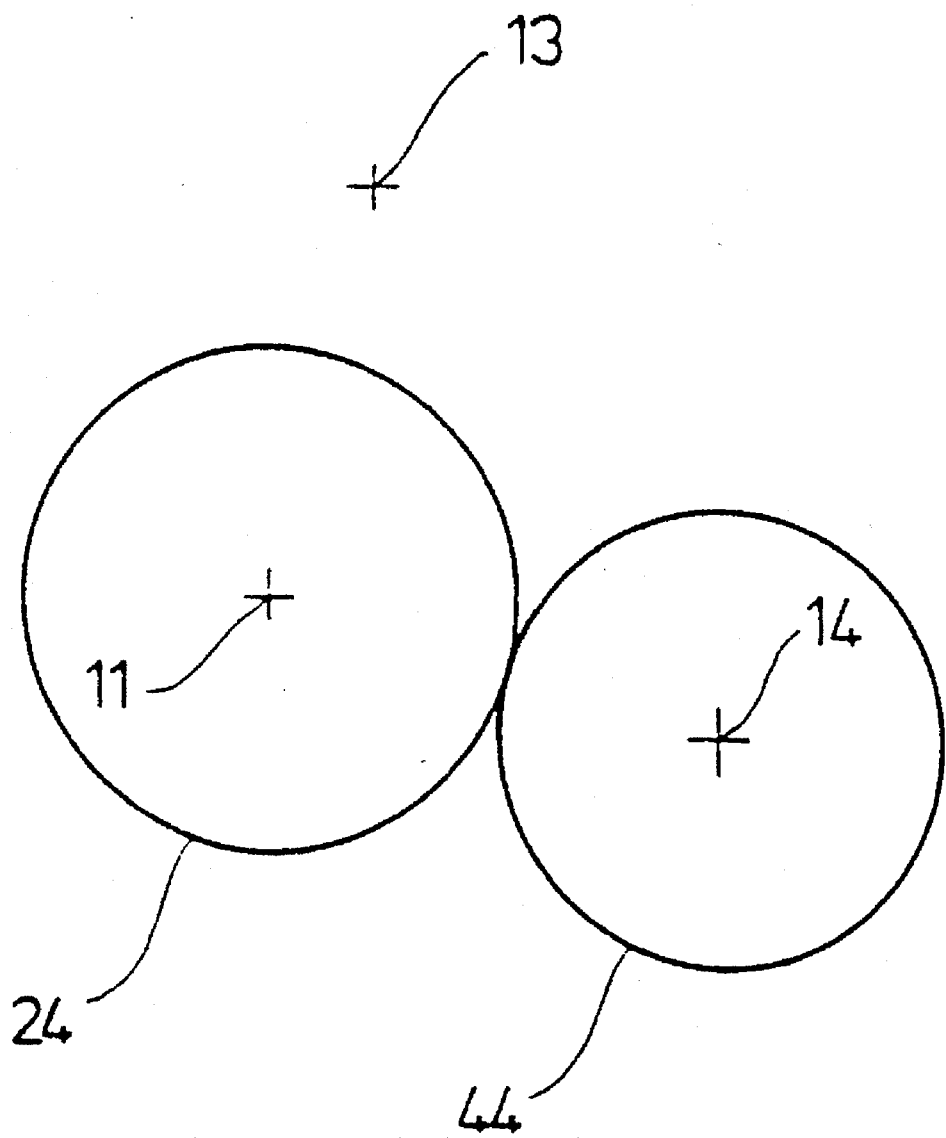

In planes III and IV, corresponding to the representations in FIGS. 3 and 4, we only find conventionally arranged two pairs of toothed wheels 21/31 and 22/42, respectively, meshing with each other. These pairs of toothed wheels constitute the second and the fifth forward gear, respectively.

In plane V of FIG. 1, corresponding to the detailed representation of FIG. 5, the flow of torque again extends over all three shafts 11, 13 and 14. For that purpose loose toothed wheel 23 (i.e. the gearshift wheel associated to the third forward gear) on input shaft 11 simultaneously meshes with fixed toothed wheel 32 on first intermediate shaft 13 and with fixed toothed wheel 43 on second intermediate shaft 14.

Within plane VI, corresponding to the representation in FIG. 6, we again find only one conventional pair of toothed wheels 24/44 constituting the fourth forward gear.

In the first forward gear, therefore, torque flows over elements 11, 20, 30, 33, 13, 32, 23, 43, 14, 40, 50, 15.

In the second forward gear, therefore, torque flows over elements 11, 21, 31, 33, 13, 32, 23, 43, 14, 40, 50, 15.

In the third forward gear, therefore, torque flows over elements 11, 25, 23, 43, 14, 40, 50, 15.

In the fourth forward gear, therefore, torque flows over elements 11, 25, 24, 44, 14, 40, 50, 15.

In the fifth forward gear, therefore, torque flows over elements 11, 22, 42, 45, 14, 40, 50, 15.

In reverse gear, therefore, torque flows over elements 11, 20, 30, 41, 45, 14, 40, 50, 15.

As becomes apparent from the preceding explanation, the depicted embodiment of a transmission according to the invention has a short design where the number of synchronizing devices on the gearshift sleeves 25, 33 and 45 as well as their actuating elements are used optimally.

As compared with the prior art transmission mentioned at the outset, in the transmission according to the invention the torque both in the first and in the second forward gears flows over several toothed wheels such that additional, meshings of teeth and, hence, certain losses of efficiency might occur. However, considering that the associated gears are only used throughout a negligible portion of the entire operating time of the transmission, this results only in a negligible reduction of the entire transmission efficiency.

The embodiment shown may be varied in several ways, as already explained, without departing from the scope of the invention. For example, it would be possible to displace the fifth forward gear and the reverse gear from the second intermediate shaft 14 on the first intermediate shaft 13 and, by using similar designs, one could also provide a transmission having a higher number of gears within the scope of ordinary skill.

Further, it goes without saying, that any of the elements mentioned before, may not only be used in the specific combination mentioned but could also be used for combinations or alone without departing from the scope of the invention.

What we claim is:

1. A stepped motor vehicle transmission, comprising:

an input shaft;

a first intermediate shaft extending parallel to said input shaft;

a second intermediate shaft extending parallel to said input shaft;

an output shaft extending parallel to said input shaft;

a first fixed toothed wheel on said input shaft and a first loose toothed wheel on said first intermediate shaft meshing with each other and constituting a first forward gear;

a second fixed toothed wheel on said input shaft and a second loose toothed wheel on said first intermediate shaft meshing with each other and constituting a second forward gear;

first gearshift sleeve means arranged on said first intermediate shaft to drivingly connect either said first or said second loose toothed wheel with said first intermediate shaft;

a third loose toothed wheel on said input shaft and a third fixed toothed wheel on said second intermediate shaft meshing with each other and constituting a third forward gear;

a fourth loose toothed wheel on said input shaft and a fourth fixed toothed wheel on said second intermediate shaft meshing with each other and constituting a fourth forward gear;

second gearshift sleeve means arranged on said input shaft to drivingly connect either said third or said fourth loose toothed wheel with said input shaft;

a fifth loose toothed wheel on said second intermediate shaft and a fifth fixed toothed wheel on said input shaft meshing with each other and constituting a fifth forward gear;

a sixth loose toothed wheel on said second intermediate shaft meshing with said first loose toothed wheel and constituting a reverse gear;

third gearshift sleeve means arranged on said second intermediate shaft to drivingly connect either said fifth or said sixth loose toothed wheel with said second intermediate shaft;

a sixth fixed toothed wheel on said first intermediate shaft meshing with said third loose toothed wheel; and a seventh fixed toothed wheel on said second intermediate shaft and an eighth toothed wheel on said output shaft meshing with each other.

\* \* \* \* \*

UNITED STATES PATENT AND TRADEMARK OFFICE
CERTIFICATE OF CORRECTION

PATENT NO. : 5,495,775
DATED : March 5, 1996
INVENTOR(S) : Lees et al.

It is certified that error appears in the above-indentified patent and that said Letters Patent is hereby corrected as shown below:

On the title page, item [73]:

Delete "Getrag Getriebe-Und Zahnradfabrik
         Hermann . . ., Ludwigsburg"

and substitute therefor --**Getrag Getriebe- und Zahnradfabrik
                         Hermann Hagenmeyer GmbH & Cie.,
                         Ludwigsburg, Germany**--.

Signed and Sealed this

FourthDay of August, 1998

Attest:

BRUCE LEHMAN

Attesting Officer

Commissioner of Patents and Trademarks